(12) United States Patent
Wang

(10) Patent No.: US 9,106,463 B2
(45) Date of Patent: Aug. 11, 2015

(54) METHOD AND APPARATUS FOR DECODING PHYSICAL BROADCAST CHANNEL IN TIME DIVISION DUPLEXING SYSTEM

(75) Inventor: Zhankui Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 539 days.

(21) Appl. No.: 13/575,901

(22) PCT Filed: Nov. 19, 2010

(86) PCT No.: PCT/CN2010/078901
§ 371 (c)(1),
(2), (4) Date: Jul. 27, 2012

(87) PCT Pub. No.: WO2011/097909
PCT Pub. Date: Aug. 18, 2011

(65) Prior Publication Data
US 2012/0307691 A1 Dec. 6, 2012

(30) Foreign Application Priority Data
Feb. 11, 2010 (CN) .......................... 2010 1 0111930

(51) Int. Cl.
*H04L 25/03* (2006.01)
*H04B 7/216* (2006.01)
(Continued)

(52) U.S. Cl.
CPC ........ *H04L 25/03171* (2013.01); *H04L 1/0038* (2013.01); *H04L 25/03866* (2013.01); *H04L 27/2647* (2013.01); *H04L 2025/03426* (2013.01)

(58) Field of Classification Search
CPC ............... H04L 25/03866; H04L 27/2647; H04L 2025/03426; H04W 28/06; H04W 72/00; H04W 88/10
See application file for complete search history.

(56) References Cited

U.S. PATENT DOCUMENTS 8,588,347 B1 * 11/2013 Petrovic et al. ............... 375/340
2004/0120411 A1 * 6/2004 Walton et al. ................. 375/260
(Continued)

FOREIGN PATENT DOCUMENTS

| CN | 101043303 A | 9/2007 |
|---|---|---|
| CN | 101183919 A | 5/2008 |

(Continued)

OTHER PUBLICATIONS

International Search Report in international application number: PCT/CN2010/078901, mailed on Feb. 10, 2011.
(Continued)

*Primary Examiner* — Dang Ton
*Assistant Examiner* — Ryan Kavleski
(74) *Attorney, Agent, or Firm* — Oppedahl Patent Law Firm LLC

(57) ABSTRACT

The disclosure discloses a method for decoding a Physical Broadcast Channel (PBCH) in a Time Division Duplexing (TDD) system, which includes: performing de-Multiple Input Multiple Output (MIMO) processing on received data frames respectively according to antenna modes supported by the TDD system and buffering the data frames; descrambling the data frames which are buffered and subjected to the de-MIMO processing and combining, in unit of frame, the data frames descrambled in respective antenna modes; and decoding the data frames combined. The disclosure further discloses an apparatus for decoding a PBCH in a TDD system. The disclosure greatly improves the speed, correctness and performance for decoding PBCH data frames.

15 Claims, 3 Drawing Sheets

(51) Int. Cl.
*H04L 27/26* (2006.01)
*H04L 1/00* (2006.01)

(56) References Cited

U.S. PATENT DOCUMENTS

| | | |
|---|---|---|
| 2007/0230632 A1 | 10/2007 | Bai et al. |
| 2009/0060088 A1 | 3/2009 | Callard et al. |
| 2009/0149207 A1 | 6/2009 | Zhang et al. |
| 2009/0196240 A1* | 8/2009 | Frederiksen et al. ......... 370/329 |
| 2009/0245435 A1 | 10/2009 | Challa et al. |
| 2009/0316840 A1 | 12/2009 | Park et al. |
| 2011/0026645 A1 | 2/2011 | Luo et al. |
| 2011/0075611 A1* | 3/2011 | Choi ............................ 370/329 |
| 2012/0076102 A1* | 3/2012 | Ko et al. ...................... 370/329 |
| 2012/0307699 A1* | 12/2012 | Lindoff et al. ................ 370/311 |

FOREIGN PATENT DOCUMENTS

| | | |
|---|---|---|
| EP | 2605438 A2 | 6/2013 |
| WO | 2007115284 A1 | 10/2007 |
| WO | 2009072789 A2 | 6/2009 |
| WO | 2009121045 A2 | 10/2009 |

OTHER PUBLICATIONS

English Translation of the Written Opinion of the International Search Authority in international application number: PCT/CN2010/078901, mailed on Feb. 10, 2011.

Supplementary European Search Report in European application number: 10845579.1, mailed on Feb. 13, 2015. (7 pages—see entire document).

\* cited by examiner

METHOD AND APPARATUS FOR DECODING PHYSICAL BROADCAST CHANNEL IN TIME DIVISION DUPLEXING SYSTEM

TECHNICAL FIELD

The disclosure relates to a technology for decoding a Physical Broadcast Channel (PBCH), and in particular to a method and an apparatus for decoding a PBCH in a Long Term Evolution (LTE) Time Division Duplexing (TDD) system.

BACKGROUND

The LTE system is a new generation wireless communication system based on the technologies of Orthogonal Frequency Division Multiplexing (OFDM) and Multiple Input Multiple Output (MIMO). In a physical layer of the LTE system, the PBCH bears Master Information Block (MIB) information of the system, and System Frame Number (SFN), bandwidth, Hybrid Automatic Repeat Request (HARQ) Indicator Channel (HICH) information and the like can be acquired by decoding the PBCH. For a cell, a User Equipment (UE) cannot complete subsequent cell residence and transmission of all services until the UE acquires the MIB information by correctly decoding the PBCH. It can be seen that, a way, speed and performance of decoding the PBCH are very important.

FIG. 1 is a diagram showing a LTE-TDD frame structure in a normal Cyclic Prefix (CP) mode, as shown in FIG. 1, areas overlapped by oblique lines are the locations where the PBCH is born in a system frame; the length of a Transmission Time Interval (TTI) of the PBCH is 40 ms constantly, and PBCH data of four frames within the same TTI are the same but are scrambled by different scrambling codes. The number of antennas should be considered when the PBCH is decoded due to the MIMO technology used by LTE. The bearings of other channels in the system are demonstrated as icons shown in FIG. 1, thereby needing no further description.

The LTE system is the newer wireless communication system, and there is no detailed description so far for a specific implementation of decoding the PBCH. For example, a conventional online serial decoding mode may be adopted, that is, every time when a PBCH signal is received, a possible decoding mode is attempted, then the total of the attempt is 3 (antenna number)×4 (scrambling mode)=12 with one frame (10 ms) for each attempt and 120 ms in total. Such decoding mode consumes a lot of time and is difficult to guarantee correctness of the decoding in a poor channel environment.

SUMMARY

In view of the problem above, the main purpose of the disclosure is to provide a method and an apparatus for decoding a PBCH in a TDD system.

To achieve the purpose above, the technical solution of the disclosure is realized as follows.

A method for decoding a PBCH in a TDD system is provided, which includes:

performing de-Multiple Input Multiple Output (MIMO) processing on received data frames respectively according to antenna modes supported by the TDD system and buffering the data frames;

descrambling the data frames which are buffered and subjected to the de-MIMO processing and combining, in unit of frame, the data frames descrambled in respective antenna modes; and decoding the data frames combined.

Preferably, the combining in unit of frame the data frames descrambled in respective antenna modes may specifically include:

sequencing all scrambling codes supported by the TDD system, descrambling current data frames by using respective scrambling codes and storing descrambled data frames into respective storage areas in sequence; and descrambling, in a cyclic shift, each subsequently received data frame by using each scrambling code, and performing combination on data frames subsequently descrambled and corresponding descrambled data frames previously stored according to a sequence after the cyclic shift, wherein before log-likelihood ratio (LLR) combination, when a last combined data frame is descrambled by a last scrambling code, all data frames in a corresponding storage area are deleted and currently descrambled data frames are stored into the corresponding storage area.

Preferably, before performing de-MIMO processing on received data frames respectively according to antenna modes supported by the TDD system, the method may further include:

acquiring frame border information of the TDD system and determining locations of Physical Broadcast Channel (PBCH) data in respective data frames in the received data according to the frame border information.

Preferably, the method may further include that:

when the data frames are still not correctly decoded while the number of the data frames combined exceeds a predetermined threshold, determining that the PBCH fails to be decoded successfully wherein the threshold is greater than or equal to $2(T_{tti}/T_f)-1$, $T_{tti}$ being a transmission time interval of the PBCH and $T_f$ being a length of a data frame.

Preferably, the combination may be LLR combination or soft bit combination.

Preferably, the antenna mode may include at least one of following modes:

a single antenna mode, a dual antenna mode and a quad antenna mode.

An apparatus for decoding a Physical Broadcast Channel (PBCH) in a Time Division Duplexing (TDD) is provided, which includes: a de-Multiple Input Multiple Output (MIMO) unit, a descrambling and combining unit and a decoding unit, wherein the de-MIMO unit is configured to perform de-MIMO processing on received data frames respectively according to antenna modes supported by the TDD system and buffering the data frames;

the descrambling and combining unit is configured to descramble, in unit of frame, the data frames which are buffered and subjected to the de-MIMO processing, and combine the data frames descrambled in each antenna mode; and the decoding unit is configured to decode the data frames combined.

Preferably, the descrambling and combining unit includes a first descrambling subunit, a storage subunit, a second descrambling subunit and a combining subunit, wherein the first descrambling subunit is configured to sequence all scrambling codes supported by the TDD system and descramble current data frames by using respective scrambling codes;

the storage subunit is configured to store the data frames descrambled by using the scrambling codes into respective storage areas according to a sequence of the scrambling codes;

the second descrambling subunit is configured to descramble, in a cycle shift, each subsequently received data frame by using each scrambling code; and the combining subunit is configured to combine the data frames descrambled by the second descrambling subunit with corresponding descrambled data frames previously stored according to a sequence after the cyclic shift, wherein, before the combination, when a last combined data frame is descrambled by a last scrambling code, all data frames in a corresponding storage area are deleted and currently descrambled data frames are stored into the corresponding storage area.

Preferably, the apparatus may further include an acquiring unit and a first determining unit, wherein the acquiring unit is configured to acquire frame border information of the TDD system; and the first determining unit is configured to determine PBCH data in respective data frames in received data according to the frame border information.

Preferably, the apparatus may further include:

a second determining unit configured to, when the data frames are still not correctly decoded while the number of the data frames combined exceeds a predetermined threshold, determine that the PBCH fails to be decoded successfully, wherein the threshold is greater than or equal to $2(T_{tti}/T_f)-1$, $T_{tti}$ being a transmission time interval of the PBCH and $T_f$ being a length of a data frame.

Preferably, the combination may be LLR combination or soft bit combination.

Preferably, the antenna mode may include at least one of following modes:

a single antenna mode, a dual antenna mode and a quad antenna mode.

In the disclosure, when the decoding of a PBCH is performed for received data frames of a network side, a de-MIMO processing of multiple antennas is performed on the data frames respectively according to antenna modes supported by a TDD system at first, and then the data frames which are subjected to the de-MIMO processing in respective antenna modes are descrambled, combined and decoded respectively according to all scrambling ways of the PBCH. In the disclosure, since data frames descrambled and data frames subjected to the de-MIMO processing are processed in parallel in way of caching data, the speed and efficiency of the decoding are guaranteed; moreover, the data frames descrambled are subjected to LLR combination, so that the energy of data frames to be decoded is increased and the correctness and performance of decoding the data frames are greatly improved.

DETAILED DESCRIPTION

The basic idea of the disclosure is that, when the decoding of a PBCH is performed for received data frames of a network side, a de-MIMO processing of multiple antennas is performed on the data frames respectively according to antenna modes supported by the TDD system at first, and then the data frames which are subjected to the de-MIMO processing in respective antenna modes are descrambled, combined and decoded respectively according to all scrambling ways of the PBCH.

To make the purpose, technical solution and advantages of the disclosure clearer, the disclosure will be further described in detail with reference to the embodiments and accompanying drawings hereinafter.

Figure 1:
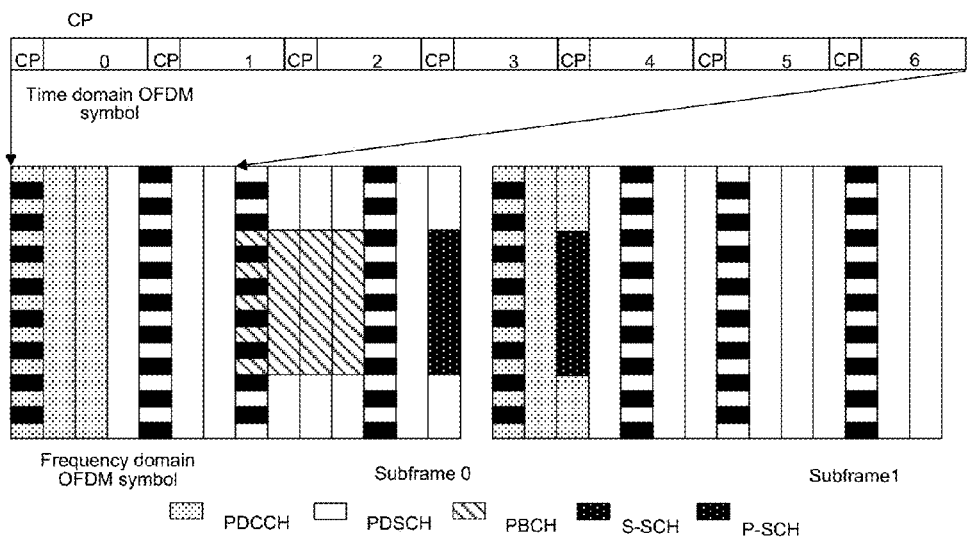
FIG. 1 is a diagram showing a structure of LTE-TDD frames in a normal CP mode.
Figure 2:
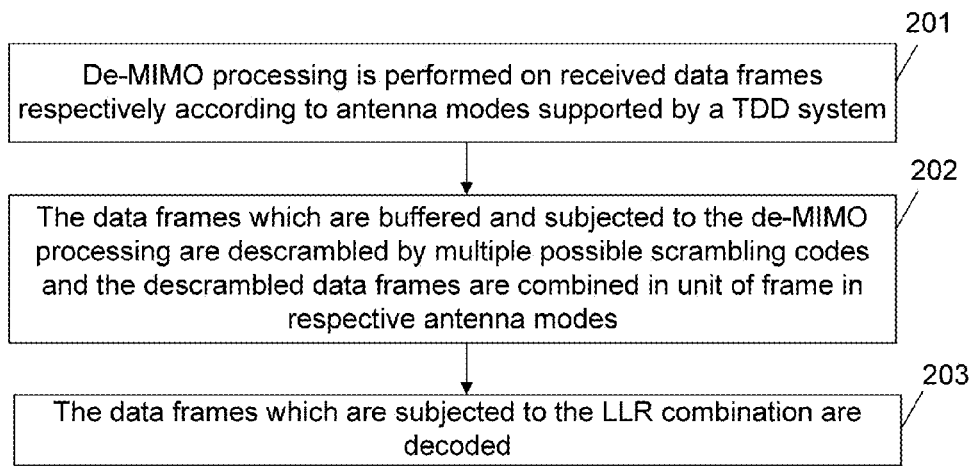
FIG. 2 is a flowchart of a method for decoding a physical broadcast channel in a time division duplexing system of the disclosure.

FIG. 2 is a flowchart of a method for decoding a physical broadcast channel in a time division duplexing system of the disclosure, and as shown in FIG. 2, the method includes the following steps.

Step 201: de-MIMO processing is performed on received data frames respectively according to antenna modes supported by a TDD system.

In the step, when accessing to a cell, a user terminal firstly searches and acquires such information of the system as frame border, bandwidth and the like from the cell, to determine the border of the data frames in the current system, thereby realizing synchronization of the data frames at a network side.

In the disclosure, after the synchronization of the frames, the location where the PBCH data is located in the data frames is determined, or only the PBCH data is processed correspondingly.

After the synchronization of the data frames is realized, the de-MIMO processing of multiple antennas is performed on the currently received data frames. Specifically, in an LTE-TDD system, an antenna used for sending data by a system side may be a single antenna, a dual antenna and a quad antenna, so that a de-single antenna, de-dual antenna and de-quad antenna processing is performed on the currently received data frames respectively. The de-MIMO processing of multiple antennas is the prior art, so that its implementation detail needs no further description in the disclosure.

The data frames subjected to the de-MIMO processing are stored in different buffers respectively for subsequent processing.

Step 202: the data frames which are buffered and subjected to the de-MIMO processing are descrambled by multiple possible scrambling codes and the descrambled data frames are combined in unit of frame in respective antenna modes.

In the disclosure, various combining methods, such as Log Likelihood Ratio (LLR) combination, soft bit combination and the like, can be adopted according to the type of input data. The disclosure takes the LLR combination as an example for explanation, and other combining methods are similar to the same, thereby needing no further description.

The data frames subjected to the de-MIMO processing further need to be descrambled. The data frames subjected to the de-MIMO processing are descrambled respectively by using the scrambling codes which are used by the system side for scrambling the PBCH, and the LLR-combination is performed on the data frames descrambled, wherein the LLR combination is aimed at the data frames of the same antenna mode. First, all the scrambling codes of the PBCH supported by the TDD system are sequenced, and the current data frames are descrambled by using respective scrambling codes and the descrambled data frames are stored into respective storage areas in sequence; and each subsequently received data frame is descrambled in the cyclic shift by using each scrambling code, and the LLR combination is performed on data frames subsequently descrambled and corresponding descrambled data frames previously stored according to the sequence after the cyclic shift; wherein before the LLR combination, when a last data frame which is subjected to the LLR combination is descrambled by a last scrambling code, all data frames in a corresponding storage area are deleted and currently descrambled data frames are stored into the corresponding storage area.

Figure 3:
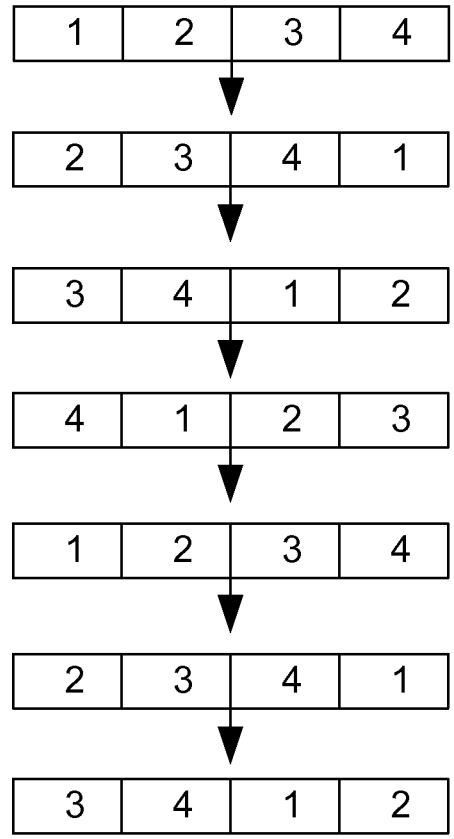
FIG. 3 is a diagram showing a combination process of the disclosure.

As shown in FIG. 3, it is assumed that there are four kinds of scrambling codes used for scrambling a PBCH by a TDD system, and the scrambling codes are sequenced in random, such as 1, 2, 3, and 4, so the first data frame received is descrambled by scrambling codes 1, 2, 3, and 4 respectively and descrambled data frames 1, 2, 3, and 4 are stored respectively.

The second data frame is descrambled by scrambling codes 2, 3, 4, and 1, and the second data frame descrambled and the descrambled data frames 1, 2, 3, and 4 previously stored perform the LLR combination. Wherein, when the data frame descrambled by the scrambling code 1 of the second data frame and the descrambled data frame 4 previously stored are combined, because data frame (the first frame) of a storage area corresponding to the data frame previously stored is descrambled by the scrambling code 4, the descrambled data frame in the storage area is deleted (the first data frame is the data frame descrambled by the scrambling code 4), the second data frame descrambled by the scrambling code 1 is directly stored into the fourth storage area.

The received data frames are descrambled every time when the cycle shift shifts one bit.

Step 203: the data frames which are subjected to the LLR combination are decoded.

That the data frames which are subjected to the LLR combination are decoded in Step 203 specifically includes that: the data frames subjected to the LLR combination are de-interleaved, a viterbi decoding is performed on the de-interleaved data, a Cyclical Redundancy Check (CRC) decoding is performed on the data subjected to the viterbi decoding, during the decoding, when a CRC is correct, the PBCHs of the data frames are correctly decoded; otherwise, the PBCHs of the data frames fail to be decoded successfully.

In the disclosure, the time length of a TTI of a PBCH is 40 ms, which is equivalent to the length of four data frames, so the frames subjected to the LLR combination in Step 202 can be accurately decoded by using seven data frames in theory, that is, an initial TTI of the PBCH in the data frames can be determined whatever TTI time slot the PBCH in the first data frame received by a user terminal is in, so that the PBCH is correctively decoded.

Based on the decoding method above, in the disclosure, when the data frames are still not correctly decoded while the number of the data frames subjected to the LLR combination exceeds a predetermined threshold, the PBCH fails to be decoded successfully, Step 201 is executed and a decoding processing is performed again; wherein the threshold is greater than or equal to $2(T_{tti}/T_f)-1$, $T_{tti}$ is a transmission time interval of the PBCH and $T_f$ is a length of a data frame.

Figure 4:
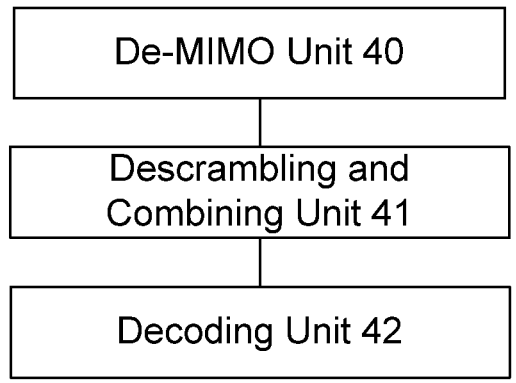
FIG. 4 is a diagram showing a first composition structure of an apparatus for decoding a physical broadcast channel in a time division duplexing system of the disclosure.

FIG. 4 is a diagram showing a first composition structure of an apparatus for decoding a physical broadcast channel in a time division duplexing system of the disclosure, as shown in FIG. 4, the apparatus for decoding a physical broadcast channel in a time division duplexing system includes a de-MIMO unit 40, a descrambling and combining unit 41 and a decoding unit 42, wherein the de-MIMO unit 40 is configured to perform de-MIMO processing on received data frames respectively according to antenna modes supported by the TDD system and buffering the data frames;

the descrambling and combining unit 41 is configured to descramble the data frames which are buffered and subjected to the de-MIMO processing and combine, in unit of frame, the data frames descrambled in each antenna mode; and the decoding unit 42 is configured to decode the data frames combined.

The descrambling and combining unit 41 includes a first descrambling subunit, a storage subunit, a second descrambling subunit and an LLR combining subunit, wherein the first descrambling subunit is configured to sequence all scrambling codes supported by the TDD system and descramble current data frames by using respective scrambling codes;

the storage subunit is configured to store the data frames descrambled by using the scrambling codes into respective storage areas according to a sequence of the scrambling codes;

the second descrambling subunit is configured to descramble, in a cycle shift, each subsequently received data frame by using each scrambling code; and the combining subunit is configured to combine the data frames descrambled by the second descrambling subunit with corresponding descrambled data frames previously stored according to a sequence after the cyclic shift; wherein, before the combination, when a last combined data frame is descrambled by a last scrambling code, all data frames in a corresponding storage area are deleted and currently descrambled data frames are stored into the corresponding storage area.

In the disclosure, the data frames can be combined in the way of the LLR combination, the soft bit combination and the like.

Figure 5:
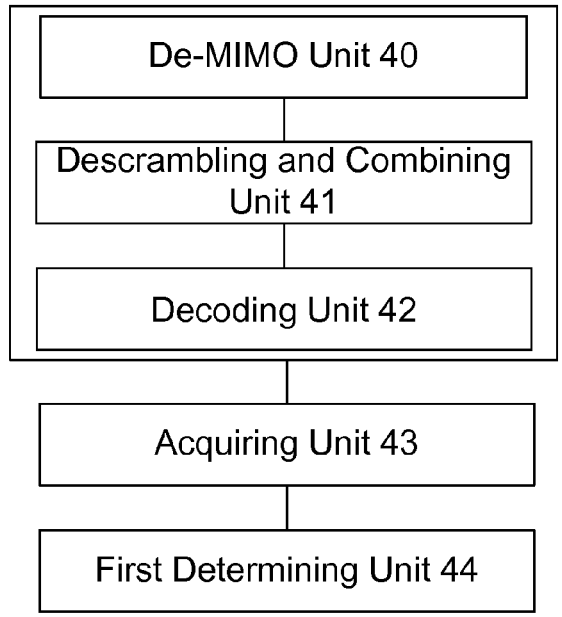
FIG. 5 is a diagram showing a second composition structure of an apparatus for decoding a physical broadcast channel in a time division duplexing system of the disclosure.

FIG. 5 is a diagram showing a second composition structure of an apparatus for decoding a physical broadcast channel in a time division duplexing system of the disclosure, as shown FIG. 5, based on the apparatus shown in FIG. 4, the apparatus for decoding a physical broadcast channel in a time division duplexing system in the example further includes an acquiring unit 43 and a first determining unit 44, wherein the acquiring unit 43 is configured to acquire frame border information of the TDD system; and the first determining unit 44 is configured to determine respective data frames in received data according to the frame border information.

Figure 6:
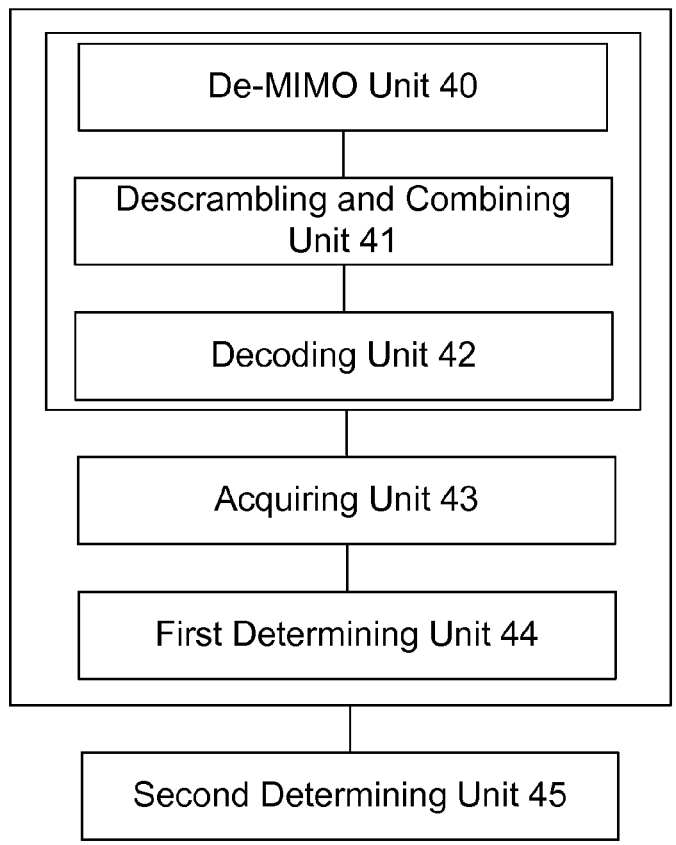
FIG. 6 is a diagram showing a third composition structure of an apparatus for decoding a physical broadcast channel in a time division duplexing system of the disclosure.

FIG. 6 is a diagram showing a third composition structure of an apparatus for decoding a physical broadcast channel in a time division duplexing system of the disclosure, as shown in FIG. 6, based on the apparatus shown in FIG. 4 or FIG. 5 (this example is based on the apparatus shown in FIG. 5), the apparatus for decoding a physical broadcast channel in a time division duplexing system in the example further includes a second determining unit 45 configured to, when the data frame are still not correctly decoded while the number of the combined data frames subjected to the LLR combination exceeds a predetermined threshold, determine that the PBCH fails to be decoded successfully; wherein the threshold is greater than or equal to $2(T_{tti}/T_f)-1$, $T_{tti}$ is a transmission time interval of the PBCH and $T_f$ is a length of a data frame.

In FIGS. 4, 5 and 6 above, the antenna modes include at least one of following modes: a single antenna mode, a dual antenna mode and a quad antenna mode.

Those skilled in the art shall understand that, the apparatus for decoding a PBCH in a TDD system shown in FIGS. 4, 5 and 6 are designed for the method for decoding a PBCH in a TDD system forementioned, and functions of each processing unit inside the apparatus shown in FIGS. 4, 5 and 6 can be understood with reference to the description of the method forementioned, and the functions of each processing unit can be implemented either by a program running on a processor or by a specific logic circuit.

The above are only preferred embodiments of the disclosure and are not intended to limit the scope of protection of the disclosure.

The invention claimed is:

1. A method for decoding a Physical Broadcast Channel (PBCH) in a Time Division Duplexing (TDD) system, comprising:
    performing de-Multiple Input Multiple Output (MIMO) processing on received data frames respectively according to antenna modes supported by the TDD system and buffering the data frames;
    descrambling the data frames which are buffered and subjected to the de-MIMO processing and a combining, in unit of frame, the data frames descrambled in respective antenna modes; and
    decoding the data frames combined;
    wherein the combining, in unit of frame, the data frames descrambled in respective antenna modes comprises:
    sequencing all scrambling codes supported by the TDD system, descrambling current data frames by using respective scrambling codes and storing descrambled data frames into respective storage areas in sequence; and
    descrambling, in a cyclic shift, each subsequently received data frame by using each scrambling code, and performing log-likelihood ratio (LLR) combination on data frames subsequently descrambled and corresponding descrambled data frames previously stored according to a sequence after the cyclic shift;
    wherein before the LLR combination, when a last combined data frame is descrambled by a last scrambling code, all data frames in a corresponding storage area are deleted and currently descrambled data frames are stored into the corresponding storage area.

2. The method according to claim 1, further comprising:
    before performing de-MIMO processing on received data frames respectively according to antenna modes supported by the TDD system, acquiring frame border information of the TDD system and determining respective data frames in received data according to the frame border information.

3. The method according to claim 1, further comprising:
    when the data frames are still not correctly decoded while the number of the data frames combined exceeds a predetermined threshold, determining that the PBCH fails to be decoded successfully, wherein the threshold is greater than or equal to $2(T_{tti}/T_f)-1$, $T_{tti}$ being a transmission time interval of the PBCH and $T_f$ being a length of a data frame.

4. The method according to claim 1, wherein the antenna modes comprise at least one of following modes:
    a single antenna mode, a dual antenna mode and a quad antenna mode.

5. The method according to claim 2, wherein the antenna modes comprise at least one of following modes:
    a single antenna mode, a dual antenna mode and a quad antenna mode.

6. The method according to claim 3, wherein the antenna modes comprise at least one of following modes:
    a single antenna mode, a dual antenna mode and a quad antenna mode.

7. An apparatus for decoding a Physical Broadcast Channel (PBCH) in a Time Division Duplexing (TDD) system, comprising: a de-Multiple Input Multiple Output (MIMO) unit, a descrambling and combining unit and a decoding unit, wherein:
    the de-MIMO unit is configured to perform de-MIMO processing on received data frames respectively according to antenna modes supported by the TDD system and buffering the data frames;
    the descrambling and combining unit is configured to descramble the data frames which are buffered and subjected to the de-MIMO processing, and combine, in unit of frame, the data frames descrambled in each antenna mode; and
    the decoding unit is configured to decode the data frames combined,
    wherein the descrambling and combining unit comprises a first descrambling subunit, a storage subunit, a second descrambling subunit and a combining subunit; wherein
    the first descrambling subunit is configured to sequence all scrambling codes supported by the TDD system and descramble current data frames by using respective scrambling codes;
    the storage subunit is configured to store the data frames descrambled by using the scrambling codes into respective storage areas according to a sequence of the scrambling codes;
    the second descrambling subunit is configured to descramble, in a cycle shift, each subsequently received data frame by using each scrambling code; and
    the combining subunit is configured to combine the data frames descrambled by the second descrambling subunit with corresponding descrambled data frames previously stored according to a sequence after the cyclic shift, wherein, before the combination, when a last combined data frame is descrambled by a last scrambling code, all data frames in a corresponding storage area are deleted and currently descrambled data frames are stored into the corresponding storage area.

8. The apparatus according to claim 7, further comprising an acquiring unit and a first determining unit, wherein
    the acquiring unit is configured to acquire frame border information of the TDD system; and
    the first determining unit is configured to determine respective data frames in received data according to the frame border information.

9. The apparatus according to claim 7, further comprising:
    a second determining unit configured to, when the data frames are still not correctly decoded while the number of the data frames combined exceeds a predetermined threshold, determine that the PBCH fails to be decoded successfully, wherein the threshold is greater than or equal to $2(T_{tti}/T_f)-1$, $T_{tti}$ being a transmission time interval of the PBCH and $T_f$ being a length of a data frame.

10. The apparatus according to claim 7, wherein the combination is LLR combination or soft bit combination.

11. The apparatus according to claim 7, wherein the antenna modes comprise at least one of following modes:
    a single antenna mode, a dual antenna mode and a quad antenna mode.

12. The apparatus according to claim 8, wherein the combination is LLR combination or soft bit combination.

13. The apparatus according to claim 9, wherein the combination is LLR combination or soft bit combination.

14. The apparatus according to claim 8, wherein the antenna modes comprise at least one of following modes:
   a single antenna mode, a dual antenna mode and a quad antenna mode.

15. The apparatus according to claim 9, wherein the antenna modes comprise at least one of following modes:
   a single antenna mode, a dual antenna mode and a quad antenna mode.

\* \* \* \* \*